Jan. 17, 1967   G. R. MUNDSCHENK   3,298,350
DIAL POINTER ASSEMBLY
Filed Dec. 30, 1965
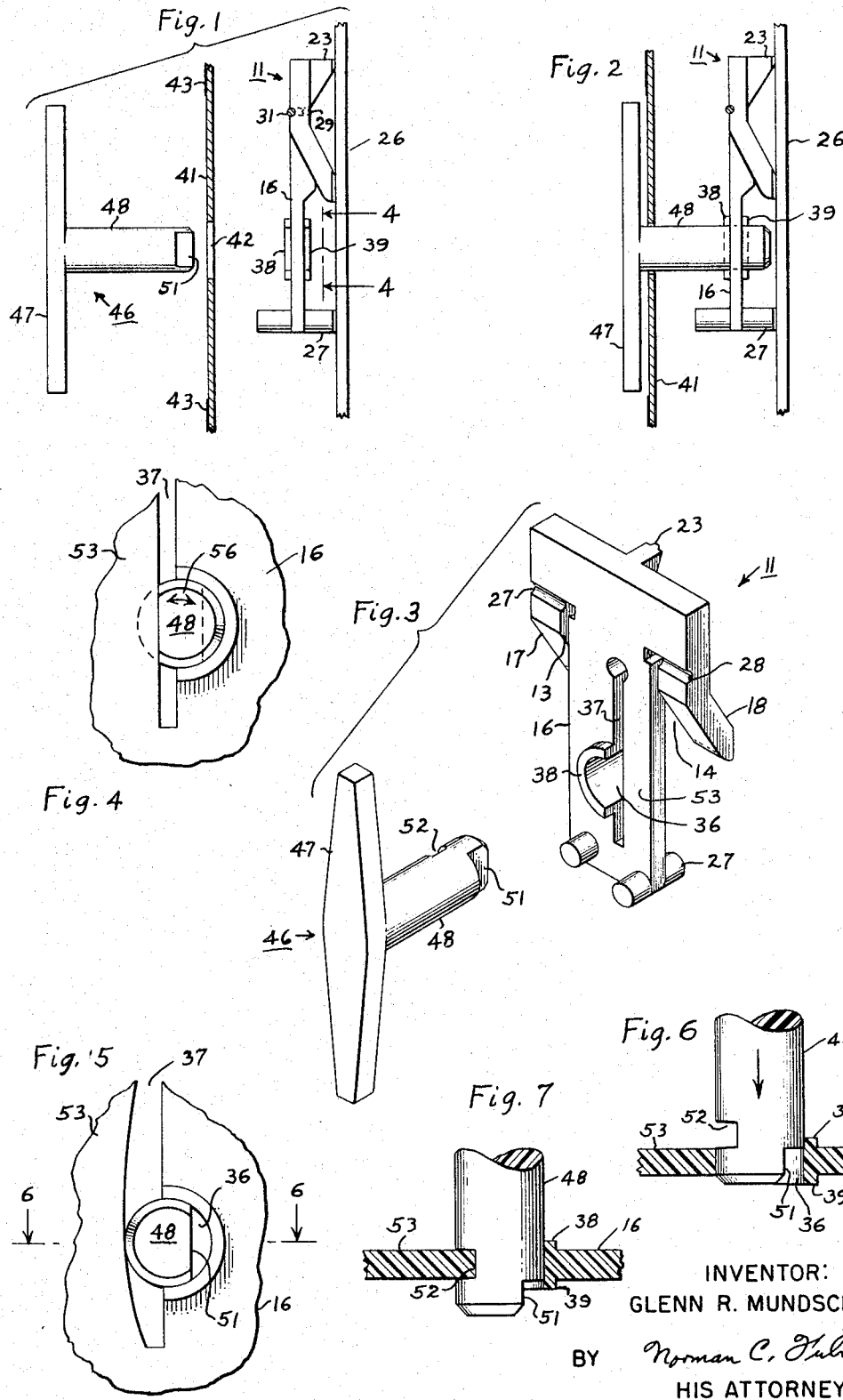
INVENTOR:
GLENN R. MUNDSCHENK,
BY Norman C. Fulmer
HIS ATTORNEY.

United States Patent Office 3,298,350
Patented Jan. 17, 1967

3,298,350
DIAL POINTER ASSEMBLY
Glenn R. Mundschenk, Utica, N.Y., assignor to General Electric Company, a corporation of New York
Filed Dec. 30, 1965, Ser. No. 517,557
4 Claims. (Cl. 116—124.1)

This invention relates to dial pointers, such as are used in radios and the like, in which a dial pointer moves along a scale such as a tuning scale.

Various dial pointer arrangements have been devised, in which a pointer member is attached to and moved by a dial cord, for example as described in co-pending patent application Serial No. 517,529. In such arrangements it is desirable that the dial cord be concealed, and therefore a window is provided in the cabinet, offset from one side of the dial cord, and the pointer is arranged to extend into view behind the window. An improved appearance can be achieved, in many radio designs, if the dial pointer can be made to appear to "float" against a dial background; i.e. the entire pointer is visible, instead of extending into view.

An object of the invention is to provide an improved dial pointer assembly.

Another object is to provide a dial pointer assembly in which the pointer can be attached to the assembly from the outside of a background member, to provide a "floating" effect.

Further objects are to provide a dial pointer assembly that is simple, reliable, inexpensive, attractive in appearance, and which is quickly and easily assembled.

Additional objects will be apparent from the following description and claims, and from the accompanying drawing.

The invention comprises, briefly and in a preferred embodiment, a pointer member and a pointer holder. The pointer member comprises a pointer having a shaft extending rearwardly thereof. A flat shoulder is provided on a side of the shaft at the rear end thereof. A transverse notch or slot is provided in the shaft at the other side thereof, axially offset from the shoulder. The pointer holder is provided with a D-shaped opening having a flat side and shaped to receive the shoulder portion of the pointer shaft. A slot is provided through the holder parallel to the flat side of the opening so that the sides of the opening can be forced apart. The thickness of the holder at the flat side of the opening is approximately the same as the width of the transverse notch in the pointer shaft.

To assemble, the pointer is inserted with the shoulder end of its shaft in the D opening of the holder. The pointer is then rotated one-half turn, thus forcing apart the sides of the opening, and the pointer is then pushed in until the flat side of the D opening snaps into the notch of the shaft, thereby locking the pointer to the holder. The pointer can be removed by reversing this procedure.

In accordance with a feature of the invention, the holder is arranged to be moved by suitable means such as a dial cord, and a dial plate is positioned over the holder and is provided with a slot over the path of movement of the opening in the holder. The pointer is attached by inserting its shaft through the slot of the dial plate and into the holder opening. Thus, the pointer is easily assembled and has an attractive "floating" appearance as it moves along the dial plate.

In the drawing, FIG. 1 is an exploded view of a dial pointer assembly in accordance with a preferred embodiment of the invention, FIG. 2 is a side view of the arrangement in assembled condition, FIG. 3 is a perspective view of the dial pointer and the pointer holder parts of the assembly, FIG. 4 is a view taken from the line 4—4 of FIG. 1, FIG. 5 is similar to FIG. 4 except that the dial pointer has been rotated one-half turn, FIG. 6 is a view, partly in cross-section, taken on the line 6—6 of FIG. 5, and FIG. 7 is the same as FIG. 6 except that the dial pointer has been pushed into its final position.

A pointer holder 11 is provided with a pair of slots 13–14 to define a central portion 16 and two side portions 17 and 18. The side portions 17 and 18 slope backwardly, as shown, and a rearwardly extending rib 23 is provided near the top of the pointer holder 11. The rearwardly extending side portions 17 and 18 and the spacer rib 23 define a plurality of spacer ribs extending rearwardly of the pointer holder 11, and are adapted to ride against the front surface of a guide member 26.

Grooves 27, 28 respectively extend across the front surfaces of the side portions 17 and 18, and a groove 29 extends across the central portion 16 at the rear thereof, and these grooves engage a dial cord 31 which is arranged to move axially in front of the guide member 26, so as to move the pointer holder 11 in a straight line across the guide member 26, as is described in the aforementioned co-pending patent application.

Additional rearwardly-extending spacer ribs 27 may be provided if desired.

The pointer holder 11 is provided with a D-shaped opening 36 therethrough, and also with a slot 37 therethrough extending through the opening 36, and parallel to the flat side thereof. The pointer holder 11 is made from slightly resilient material, such as plastic, and the slot 37 permits the sides of the opening 36 to be forced apart. Rims 38 and 39 extend frontwardly and rearwardly, respectively, from the center region 16 around the curved portion of the opening 36.

A dial plate 41 is positioned in front of and parallel to the guide member 26, and is provided with an elongated slot 42 which is aligned over the path of movement of the opening 36 of the guide member 11. Scale indicia or dial markings 43 are provided on the dial plate 41, and could comprise AM and/or FM frequency numbers, for example, if the arrangement is used for a radio.

A pointer member 46 comprises an elongated pointer 47 and a shaft 48 extending rearwardly therefrom. The shaft 48 is provided with a flat shoulder 51 at the rear end thereof and on one side of the shaft, and also is provided with a transverse notch 52 at the other side of the shaft and axially offset from the flat shoulder 51, as shown in the drawing. The thickness of the pointer holder 11 along side the flat side of the opening 36, indicated at numeral 53, is approximately the same as the width of the transverse notch 52.

The preferred steps of assembly of the invention are as follows.

The guide member 26, pointer holder 11, dial cord 31, and dial plate 41 are assembled and arranged as shown. Then, as the last step of the dial assembly, the pointer member 46 is positioned so that the shaft 48 extends through the slot 42 of the dial plate 43, and the end of the shaft 48 is inserted into the D-shaped opening 36, with the flat shoulder 51 mated with the flat side of the D opening 36. The pointer member 46 is then rotated one-half turn in either direction, as indicated by the arrow 56 in FIG. 4 which forces apart the sides of the opening 36 as shown in FIGS. 5 and 6. Then pointer member 46 is pushed rearwardly until the side 53 of the pointer holder snaps into the transverse notch 52 of the shaft 48, as shown in FIG. 7. The pointer member 46 is now held securely in place by the holder 11, and the pointer 47 will "float" along in front of the dial plate 43 when the dial cord 31 moves the pointer holder 1, as the radio or other device is tuned.

It will be apparent that the objects of the invention have been achieved, thus providing an inexpensive, easy-to-assemble, and attractive dial pointer arrangement.

While a preferred embodiment of the invention has been shown and described other embodiments and modifications thereof will be apparent to persons skilled in the art, and will fall within the scope of invention as defined in the following claims.

What I claim is:

1. A dial pointer assembly comprising a pointer member provided with a rearwardly extending shaft, said shaft being provided with a flat shoulder on a side at the rear end thereof and also provided with a transverse notch at the other side thereof axially offset from said shoulder, and a pointer holder of resilient material and provided with a D-shaped opening having a flat side and shaped to receive the shoulder portion of the pointer shaft, said pointer holder also being provided with a slot therethrough parallel to the said flat side of the opening so that the sides of the opening can be forced apart, the thickness of said holder at said flat side of the opening being approximately the same as the width of said transverse notch in the pointer shaft, whereby said pointer member can be attached to said holder member by inserting the shoulder end of the pointer member into the D opening, rotating the pointer member one-half turn to force apart the sides of the D opening, and pushing the pointer member until the flat side of the D opening snaps into the notch of the pointer shaft.

2. An assembly as claimed in claim 1, in which said holder is adapted to be moved laterally, and including a dial plate positioned over the path of movement of said holder and provided with a slot over the path of movement of said D opening, whereby said pointer member can be inserted through said dial-plate slot for attachment to said holder.

3. An assembly as claimed in claim 1, in which said pointer member includes a pointer extending transversely to said shaft.

4. An assembly as claimed in claim 1, in which said holder is provided with at least one rim extending outwardly therefrom around the curved portion of said D opening.

No references cited.

LOUIS J. CAPOZI, *Primary Examiner*.